United States Patent
Balogun (10) Patent No.: US 11,708,023 B2
(45) Date of Patent: Jul. 25, 2023

(54) VEHICLE U-TURN SIGNAL INDICATOR AND SYSTEM

(71) Applicant: Kolawole Balogun, Davie, FL (US)

(72) Inventor: Kolawole Balogun, Davie, FL (US)

(*) Notice: Subject to any disclaimer, the term of this patent is extended or adjusted under 35 U.S.C. 154(b) by 0 days.

(21) Appl. No.: 17/591,685

(22) Filed: Feb. 3, 2022

(65) Prior Publication Data

US 2022/0250537 A1 Aug. 11, 2022

Related U.S. Application Data

(60) Provisional application No. 63/146,187, filed on Feb. 5, 2021.

(51) Int. Cl.
*B60Q 1/34* (2006.01)
*B60Q 1/38* (2006.01)
*B60Q 1/50* (2006.01)
*F21S 43/241* (2018.01)
*F21S 43/14* (2018.01)

(52) U.S. Cl.
CPC .............. *B60Q 1/346* (2013.01); *B60Q 1/38* (2013.01); *B60Q 1/50* (2013.01); *F21S 43/14* (2018.01); *F21S 43/241* (2018.01); *B60Q 2900/10* (2013.01)

(58) Field of Classification Search
CPC ..................................... B60Q 1/34; B60Q 1/50
See application file for complete search history.

(56) References Cited

U.S. PATENT DOCUMENTS

| | | | | |
|---|---|---|---|---|
| 4,868,541 A * | 9/1989 | Sullivan | ................. | B60Q 1/343 340/464 |
| 5,223,312 A * | 6/1993 | Langille | ................... | B60Q 1/30 359/530 |
| 6,958,687 B1 * | 10/2005 | Smith | ...................... | B60Q 1/50 340/472 |
| 7,167,086 B1 * | 1/2007 | Goins | ...................... | B60Q 1/50 340/463 |
| 7,791,465 B1 * | 9/2010 | El-Massry | ............... | B60Q 1/50 340/478 |
| 8,519,840 B1 * | 8/2013 | Banks | ....................... | B60Q 1/34 340/475 |
| 2007/0069881 A1 * | 3/2007 | Dohan | ..................... | B60Q 1/34 340/465 |
| 2007/0274087 A1 * | 11/2007 | Herold | ................. | B60Q 1/2657 362/546 |
| 2011/0156588 A1 * | 6/2011 | Brant | ....................... | G09F 13/14 362/519 |

(Continued)

*Primary Examiner* — Eric T Eide
(74) *Attorney, Agent, or Firm* — Brennan, Manna & Diamond, LLC (57) ABSTRACT

The present invention relates to a vehicle U-turn indicator system to alert other motorists, cyclists and pedestrians of a potential U-turn made by a vehicle. The indicator is an inverted "U" shaped device having LED lights configured to blink in a running manner from one end to other and vice versa. The blinking of LED lights in one direction indicates U-turn of the vehicle in one direction (i.e. left) and in another direction indicates a U-turn of the vehicle in another direction (i.e. right). The indicator can be mounted to the front and rear of the vehicle in addition to side mirrors. An actuator is used for activating the U-turn indicator in a preferred direction.

4 Claims, 7 Drawing Sheets

(56) References Cited

U.S. PATENT DOCUMENTS

| | | | |
|---|---|---|---|
| 2014/0091920 A1* | 4/2014 | Thompson | B60Q 1/38 |
| | | | 340/475 |
| 2016/0229336 A1* | 8/2016 | Ali | B60Q 1/34 |
| 2018/0141489 A1* | 5/2018 | Zhang | B60W 30/18154 |
| 2020/0238898 A1* | 7/2020 | James | B60Q 1/2696 |

* cited by examiner

VEHICLE U-TURN SIGNAL INDICATOR AND SYSTEM

CROSS-REFERENCE TO RELATED APPLICATION

The present application claims priority to, and the benefit of, U.S. Provisional Application No. 63/146,187, which was filed on Feb. 5, 2021, and is incorporated herein by reference in its entirety.

FIELD OF THE INVENTION

The present invention relates generally to the field of vehicle accessories. More specifically, the invention relates to a U-turn indicator for vehicles for providing users with an easy and convenient way of informing other drivers and pedestrians of the operator's intent to make a U-turn. The indicator is in the shape of an inverted "U" with two arrow ends having LEDs for blinking in a running or sequential manner to indicate a U-turn of the vehicle in left or right direction. Accordingly, the present disclosure makes specific reference thereto. Nonetheless, it is to be appreciated that aspects of the present invention are also equally applicable to other like applications, devices and methods of manufacture.

BACKGROUND

By way of background, vehicles have factory or original equipment manufacturers ("OEMs") installed conventional signal indicators, for example a right turn signal and left turn signal, that are activated using a level arm mounted generally next to a steering wheel of a vehicle. Other signal indicators may also be provided such as hazard or flashers which may operate a plurality of lights or signals on the vehicle. These signal lights can include factory or OEM installed turn signal lights on the front and back of the vehicle, and may be provided with the vehicle exterior brake lights or separate from the brake lights and part of a separate signaling system. The lever arm generally actuates a set of mechanical or electronic switches inside the steering column and/or other types of circuits and/or vehicle computer controls to activate the right turn signal and left turn signal as needed.

In operation, an operator driving a vehicle wishing to make a left turn or right turn should provide a corresponding turn signal by engaging the turn lever arms adjacent to steering wheels, which causes the front left and right turn lights and rear left and right signal lights to start a regular blinking process. However, when the driver wants to make a U-turn signal, a specific U-turn signal is not available and a right or left turn signal is provided by the driver which suggests to another driver of a following vehicle or oncoming vehicle that the driver is making a right or left turn. This may lead to a crash as the driver making a U-turn slows down the vehicle more than expected by the other drivers in the immediate vicinity. More specifically, a following driver can run into the driver making the U-turn as they misjudge the forward vehicle's intentions and speed, and wrongfully assume the driver is making a right or left turn but not a U-turn. In addition, pedestrians crossing the road could be injured by the vehicle making the U-turn as they can assume the vehicle making the U-turn is only proceeding with a left or right turn.

Therefore, there exists a long felt need in the art for a U-turn signal that can be used for solving problems associated with indicating the intention to make a U-turn to other vehicles in the vicinity. There is also a long felt need in the art for a vehicle U-turn indicator that is convenient and easy to use and can be installed as an after-market option as well as part of an OEM equipment package. Additionally, there is a long felt need in the art for a vehicle U-turn indicator that informs other vehicle drivers, motorists and pedestrians about a driver's intent to make a U-turn. Moreover, there is a long felt need in the art for a vehicle U-turn indicator that can help prevent accidents and crashes with other vehicles and avoid injuring nearby pedestrians while making a U-turn. Further, there is a long felt need in the art for a vehicle U-turn indicator that can be integrated or retrofitted in a vehicle. Finally, there is a long felt need in the art for a vehicle U-turn signal indicating device and system provided on a vehicle for alerting oncoming and following vehicles and pedestrians to a vehicle operator's intention to make a U-turn.

The subject matter disclosed and claimed herein, in one embodiment thereof, comprises a vehicle U-turn signal indicator for providing the operator of a vehicle with an easy and convenient means of informing motorists and pedestrians of the operator's intent to make a U-turn. The indicator is configured to be mounted to a front bumper, rear bumper and side mirrors of the vehicle or other body panels or frame members of the vehicle. The indicator is associated with a U-turn indicating system that allows a user to activate the indicator using a lever arm positioned next to a steering wheel or activating the indicator using buttons or switches disposed on the dashboard of the vehicle.

The indicator further comprising a transparent inverted U-shape weatherproof housing with two arrow ends including a first arrow end and a second arrow end. A plurality of LEDs positioned inside the housing for illumination and sequential or simultaneous blinking such that the LED lights are activated by a U-turn electronic switch positioned inside the vehicle. The plurality of LED lights are activated in such a manner that each LED follows a subsequent LED to provide a running or continuous appearance to the LED lights blinking from a first arrow end to the second arrow end to indicate the direction of a U-turn of the vehicle in left direction and the plurality of LEDs are activated such that each LED light follows a subsequent LED to provide a running or continuous appearance to the LED lights blinking from the second arrow end to the first arrow end to indicate a U-turn of the vehicle in the right direction. In alternate embodiments, different activation or blinking sequences may be used or some combination of activation sequences. For example, all the lights in the housing may turn on at the same time to indicate a warning to vehicles or pedestrians in the vicinity and then the sequential operation of the LED lights occurs as the vehicle begins to make the U-turn. Other combinations of lights may occur, for example instead of each light blinking, groups of lights, two, three or more may blink together and then the next group follows in sequence.

In this manner, the vehicle U-turn signal indicator and associated system of the present invention accomplishes all of the forgoing objectives and provides users with a convenient and easy to use indicator and system designed for informing motorists and pedestrians of a vehicle operator's intent to make a U-turn. The indicator makes it clear to the oncoming and the following vehicles and nearby pedestrians, cyclists and the like that the operator is going to make a U-turn and thus avoid miscommunication, confusion, injury and a potential crash.

SUMMARY OF THE INVENTION

The following presents a simplified summary in order to provide a basic understanding of some aspects of the disclosed innovation. This summary is not an extensive overview, and it is not intended to identify key or critical elements or to delineate the scope thereof. Its sole purpose is to present some general concepts in a simplified form as a prelude to the more detailed description that is presented later.

The subject matter disclosed and claimed herein, in one embodiment thereof, comprises a vehicle U-turn signal indicator. The indicator is configured to be mounted to a front bumper, a rear bumper, side mirrors or other body or frame components of the vehicle. The indicator further includes a transparent or partially transparent inverted U-shaped weatherproof housing with two arrow ends including a first arrow end and a second arrow end, a plurality of LED lights positioned inside the housing for illumination and blinking and the LED lights are activated by a U-turn electronic switch positioned inside the vehicle. The housing may be partially transparent with the transparent portion over the LED lights and then an opaque portion on the side walls and back of the housing. The plurality of LEDs are activated such that each LED or group of LED lights follows a subsequent LED to provide a running or continuous appearance to the LEDs blinking from a first arrow end to the second arrow end to indicate a U-turn of the vehicle in left direction and the plurality of LEDs are activated such that each LED or group of LED lights follows a subsequent LED to provide a running or continuous appearance to the LED lights blinking from the second arrow end to the first arrow end to indicate a U-turn of the vehicle in the right direction.

In yet another embodiment, a U-turn signal indicating system for a vehicle to indicate a desire to make a U-turn to other motorists, cyclists and pedestrians is disclosed. The system includes a U-turn signal indicator positioned on the front bumper of the vehicle, a U-turn signal indicator positioned on the rear bumper of the vehicle, a U-turn signal indicator positioned on each side mirror of the vehicle, and a U-turn signal activation lever arm positioned near the steering wheel of the vehicle. The lever arm when actuated in a first position, is configured to activate the U-turn signal indicators to indicate that a U-turn of the vehicle in a left direction is going to be undertaken, the lever arm when actuated in a second position, is configured to activate the U-turn signal indicators to indicate a U-turn of the vehicle in a right direction wherein the lever arm is coupled to a U-turn electronic switch for activating the U-turn signal indicators.

In yet another embodiment, a U-turn signal indicating system for a vehicle to indicate a preference to make a U-turn by the vehicle to other motorists, cyclists and pedestrians is disclosed. The system includes a U-turn signal indicator positioned on the front bumper of the vehicle, a U-turn signal indicator positioned on the rear bumper of the vehicle, a U-turn signal indicator positioned on each side mirror of the vehicle, and U-turn signal activation buttons positioned on the dashboard of the vehicle. A first button of the activation buttons is configured to activate the U-turn signal indicators to indicate a U-turn of the vehicle in a left direction, a second button of the activation buttons is configured to activate the U-turn signal indicators to indicate the U-turn of the vehicle a in right direction. The activation buttons are coupled to a U-turn electronic switch for activating the U-turn signal indicators.

In yet another embodiment, a U-turn signaling device for a vehicle is disclosed. The device is designed to be integrated in the manufacturing stages of the vehicle or added to an existing vehicle as part of an after market package or kit. The U-turn signal would indicate when a driver of the vehicle is preparing to make a U-turn and would eliminate the need for verbal communication or confusion of others nearby. The device is in the shape of an inverted "U" and is configured to be activated using activation buttons positioned on the dashboard of the vehicle or activated using a lever arm positioned next to the steering wheel of the vehicle. The housing may be provided with retroreflective tape to include a background that will reflect the light making the system more visible in low light conditions or night conditions. In addition, the LED lights may have lenses which are manufactured to provide reflective properties, such as prismatic lenses.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for a U-turn signal that can be used for solving problems associated with indicating a desire to make a U-turn to fellow vehicles, cyclists and pedestrians nearby. There is also a long felt need in the art for a vehicle U-turn indicator that is convenient and easy to use. Additionally, there is a long felt need in the art for a vehicle U-turn indicator that informs other vehicle drivers, motorists, cyclists and pedestrians about the vehicle driver's intent to make a U-turn. Moreover, there is a long felt need in the art for a vehicle U-turn indicator that can prevent accidents and crashes with other vehicles, cyclists and pedestrians while making a U-turn. Further, there is a long felt need in the art for a vehicle U-turn indicator that can be integrated or retrofitted in or on an existing vehicle body or frame. Finally, there is a long felt need in the art for a vehicle U-turn signal indicating device and system provided on a vehicle for alerting oncoming and following vehicles, cyclists and pedestrians of the vehicle operator's intention to make a U-turn.

The present invention, in one exemplary embodiment, is a novel U-turn signal indicating system for a vehicle to indicate a potential U-turn of the vehicle to other motorists, cyclists and pedestrians is disclosed. The system includes, in one embodiment, a U-turn signal indicator positioned on the front bumper of the vehicle, a U-turn signal indicator positioned on the rear bumper of the vehicle, a U-turn signal indicator positioned on each side mirror of the vehicle, and a U-turn signal activation lever arm positioned near the steering wheel of the vehicle. The lever arm when actuated in a first position, is configured to activate the U-turn signal indicators to indicate a U-turn of the vehicle in the left direction, the lever arm when actuated in a second position, is configured to activate the U-turn signal indicators to indicate a U-turn of the vehicle in the right direction. The lever arm is coupled to an U-turn electronic switch for activating the U-turn signal indicators.

Figure 1:
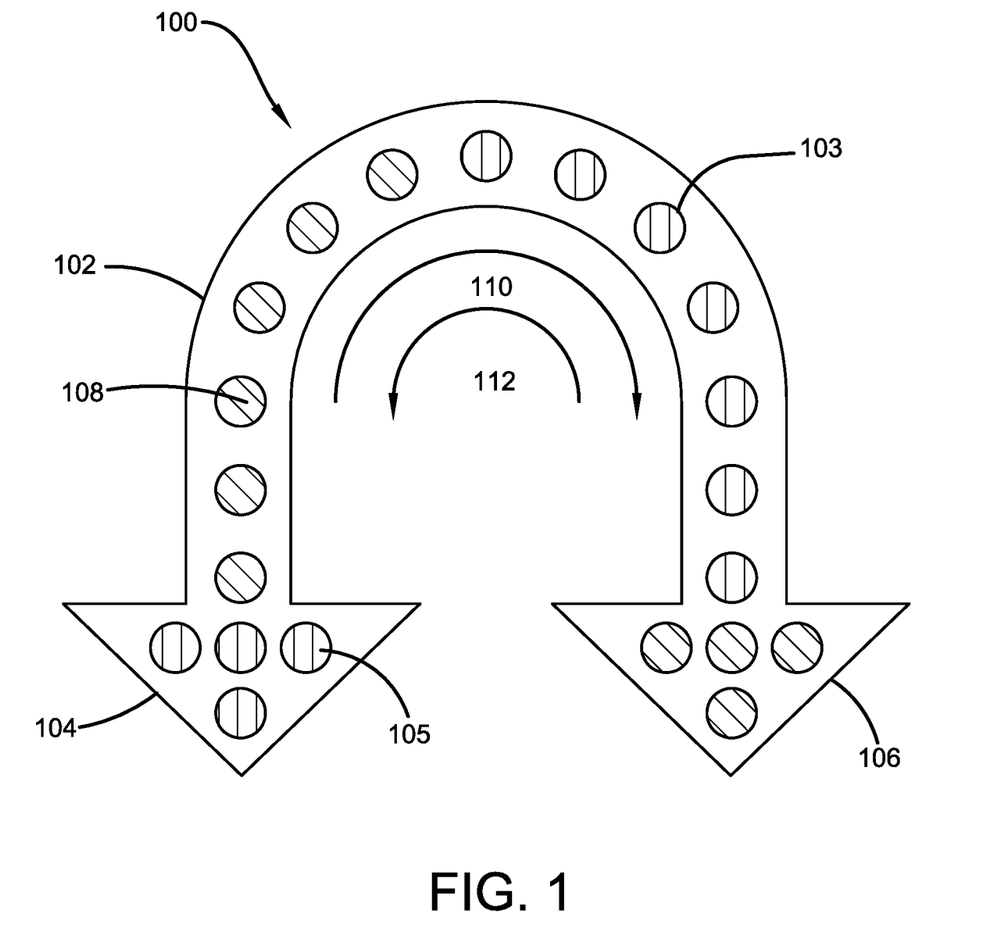
FIG. 1 illustrates a perspective view of the one potential embodiment of the U-turn signal indicator of the present invention in accordance with the disclosed architecture.
Figure 4:
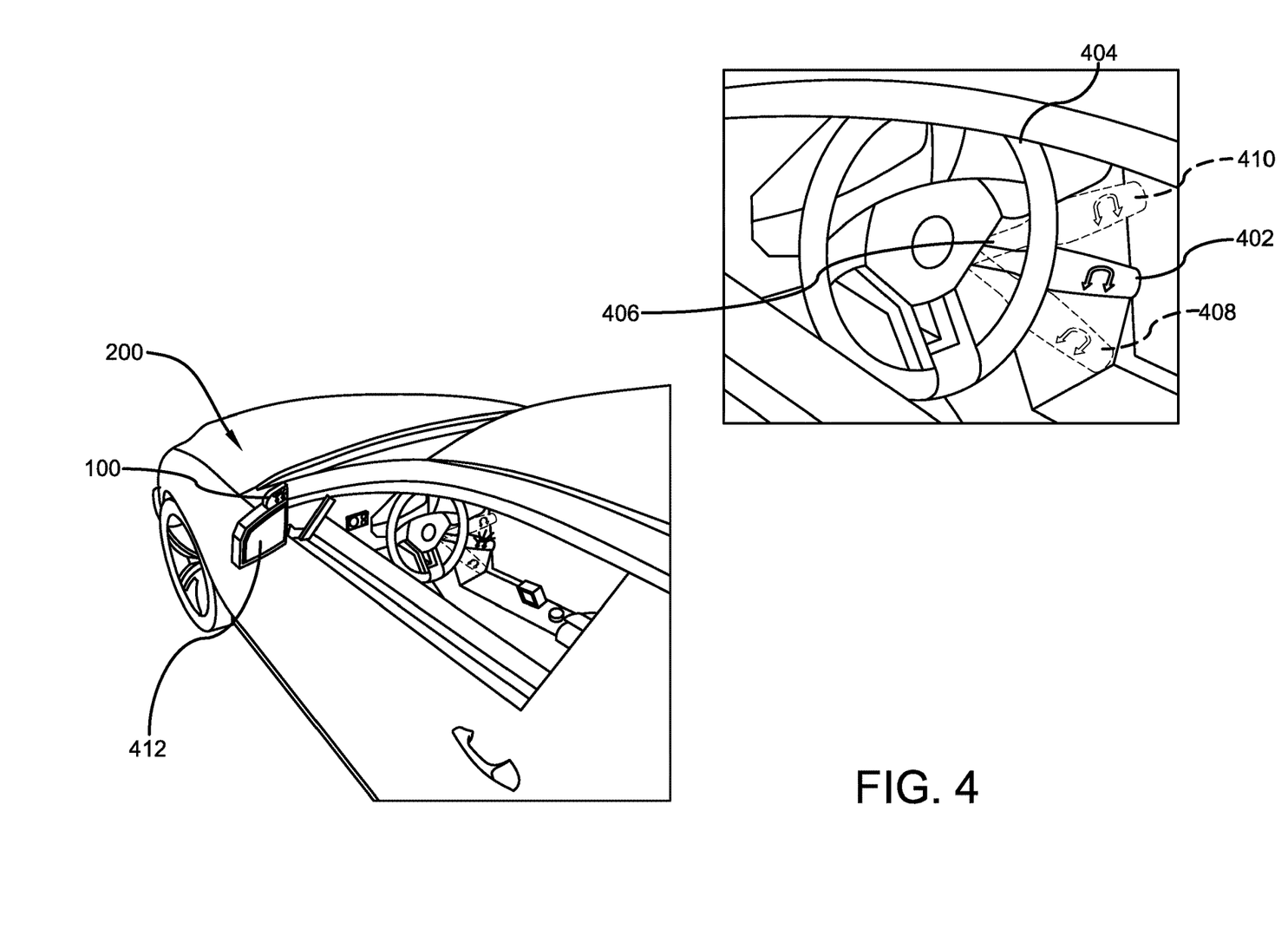
FIG. 4 illustrates a perspective view showing one potential embodiment of the U-turn signal activator arm of the present invention inside a vehicle in accordance with the disclosed architecture.
Figure 5:
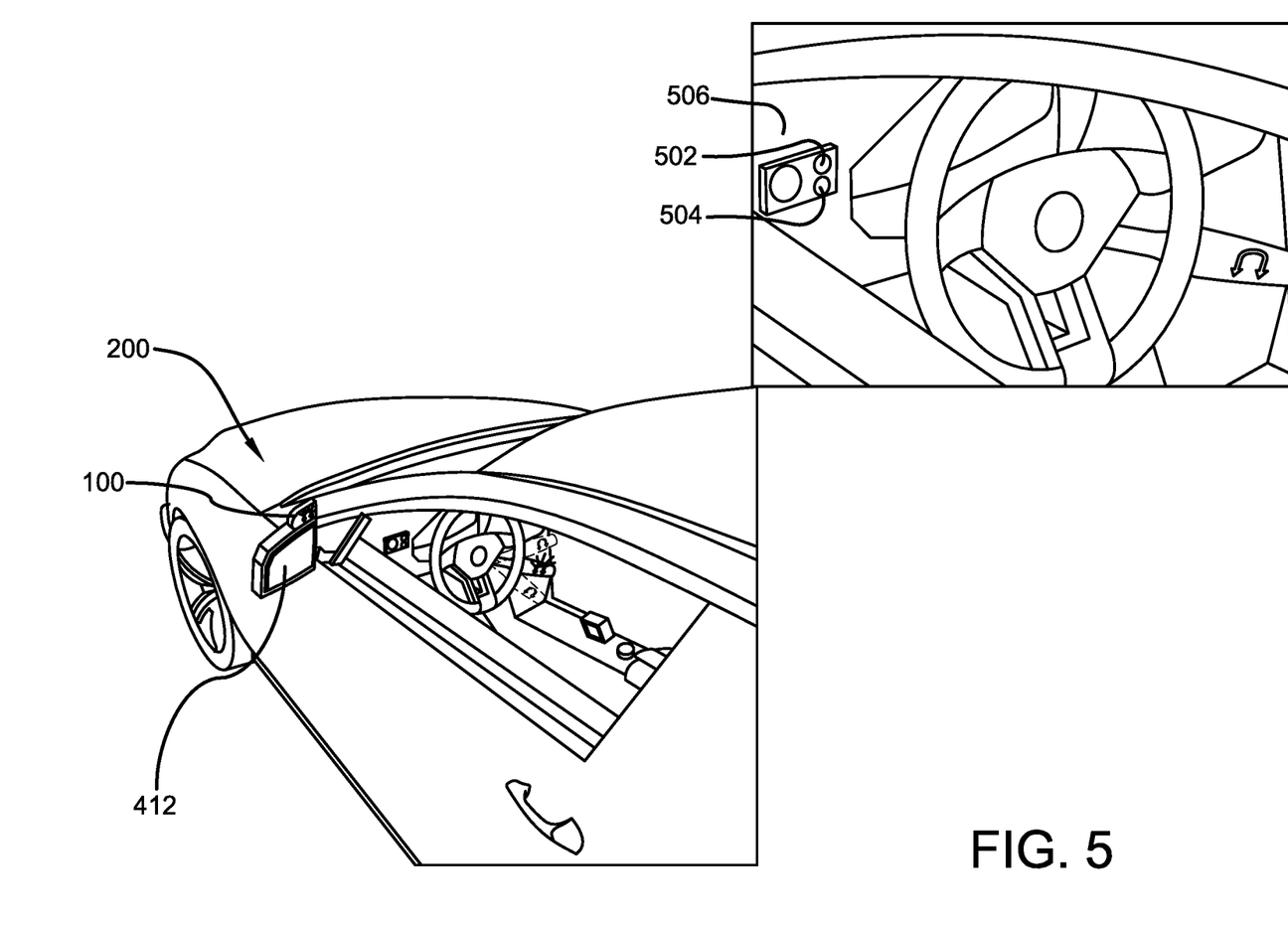
FIG. 5 illustrates a perspective view showing one potential embodiment of the U-turn indicator activator control buttons of the present invention positioned inside the vehicle in accordance with the disclosed architecture.

Referring initially to the drawings, FIG. 1 illustrates a perspective view of the one potential embodiment of the U-turn signal indicator 100 of the present invention in accordance with the disclosed specification. The U-turn signal indicator 100 is designed to mount on the body or frame of the vehicle, such as to the front and rear of a vehicle to indicate and alert other vehicle operators, cyclists and pedestrians about an intention to make an U-turn by the driver of the vehicle. The U-turn signal indicator 100 eliminates the need for verbal communication or confusion for between people when making a U-turn. More specifically, the U-turn signal indicator 100 has a weatherproof inverted U-shaped housing 102 having two arrow ends 104, 106. A plurality of light emitting diodes (LEDs) 108 are disposed in the housing 102 for providing illumination and blinking to signal the intention of the operator in making a U-turn. Preferably, the LEDs 108 are arranged such that the LEDs 108 blink in a manner that appears like each LED or group of LED lights is following a consecutive LED in one direction. The LED lights may operate in one of a continuous, sequential, simultaneous or combination of lighting configurations depending on the preferences of the user. Accordingly, the LED lights 108 may blink in a continuous, sequential or other desired manner in a first direction starting 110 from first arrow end 104 towards the second arrow end 106 to indicate U-turn. Also, the LED lights 108 also blink in a second direction starting from second arrow end 106 towards the first arrow end 104 indicating that the vehicle's U-turn in the opposite direction. The LED lights selectively toggle between the first direction 110 and the second direction 112 using an activation means disposed inside a vehicle as best shown in FIG. 4 and FIG. 5.

Figure 2:
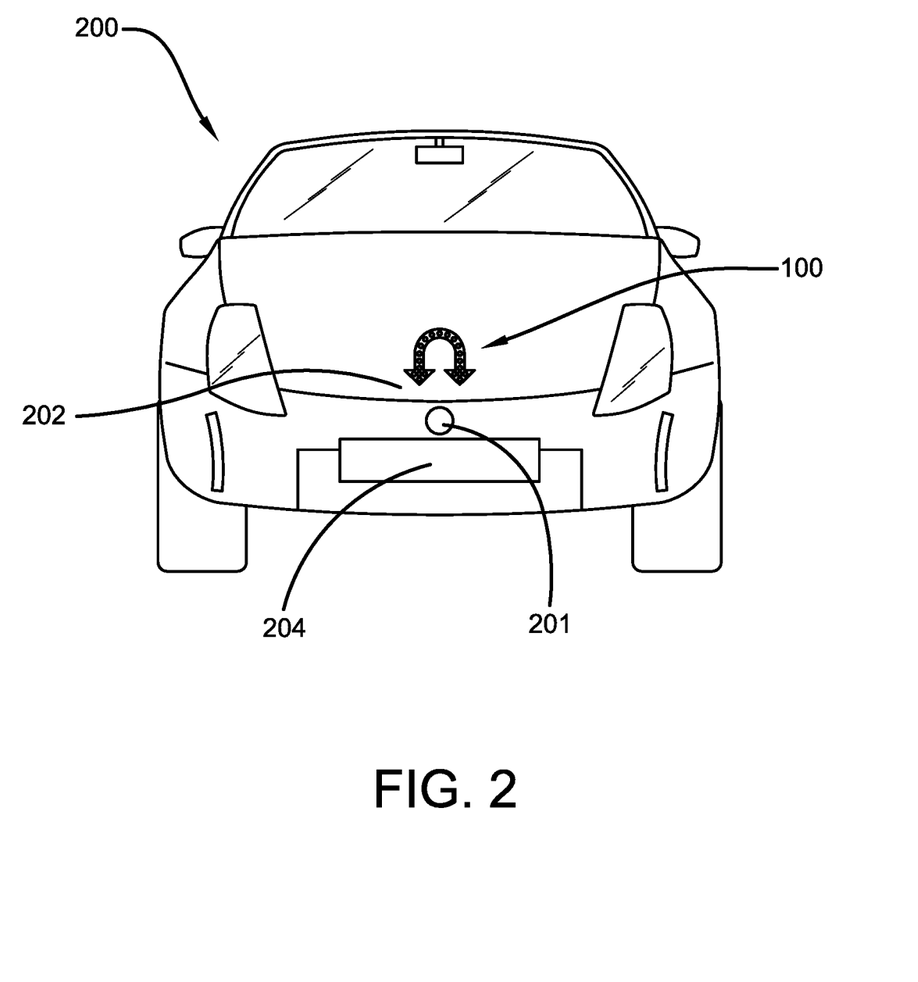
FIG. 2 illustrates a front perspective view of a vehicle equipped with one potential embodiment of the U-turn signal indicator of the present invention in accordance with the disclosed architecture.
Figure 3:
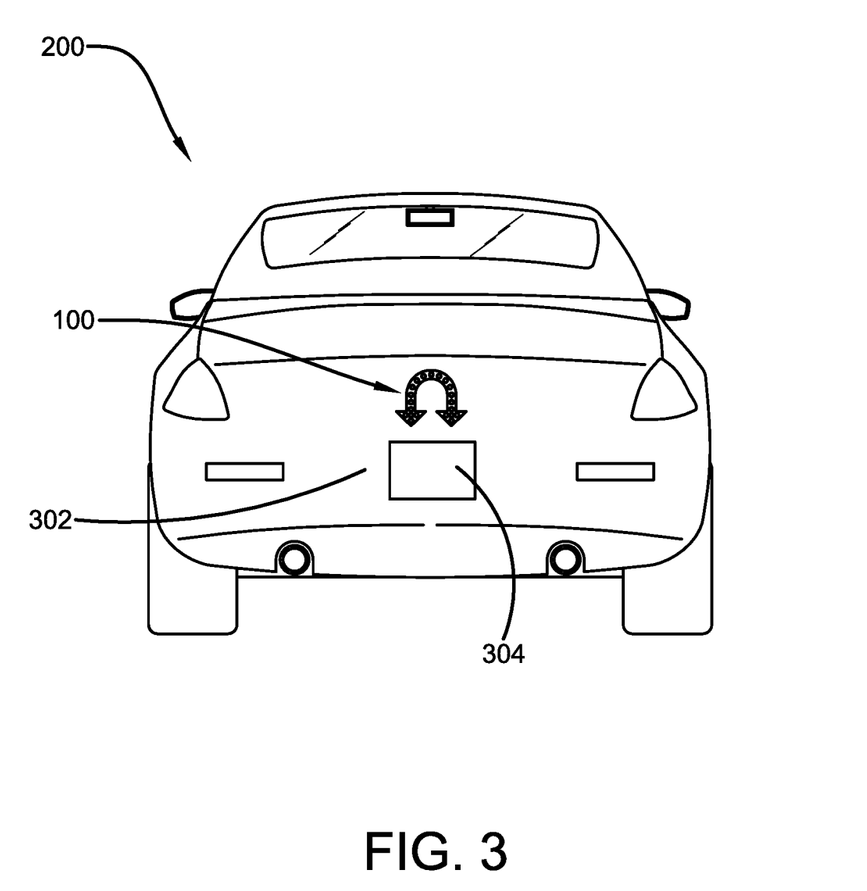
FIG. 3 illustrates a rear perspective view of a vehicle equipped with one potential embodiment of the U-turn signal indicator of the present invention in accordance with the disclosed architecture.

Due to the signaling appearance of the LEDs 108, the U-turn indicator 100 provides the ability to an operator of a vehicle to indicate the intended U-turn movement or direction towards the left of the vehicle and the intended U-turn movement or direction towards the right of the vehicle. The indicator 100 is configured to be mounted on the frame or body of the vehicle such as to the front and rear of the vehicle as shown in FIGS. 2 & 3 during the manufacturing of the vehicle or it can be retrofitted to an existing vehicle. Additionally, the U-turn indicator 100 can be mounted to side view mirrors as well as shown in FIG. 5. The U-turn signals 100 mounted to the front, rear and side view mirrors are configured to attach a common electronic switch enabling all the mounted indicators 100 illuminate and blink in the same style (i.e. same direction and color). The LED lights may be provided in different colors 103 which can signal the direction of the turn, and the arrow portions can appear in a different color 105 than the surrounding lights to show which direction will be the completion of the turn. The speaker may be positioned on either the front or back of the vehicle or any other portion of the vehicle.

It should be understood that although the preferred embodiment has blinking LEDs 108 providing a continuous or sequential appearance in the first direction and the second direction but the LEDs 108 may blink without providing a signaling appearance. The blinking in this case may be common to indicate a potential U-turn in either of the left and right direction. Further, it should be understood that the indicator 100 of the present invention is used to inform motorists, cyclists and pedestrians of a user's intent to make a U-turn with many types of vehicles and should not be limited to any particular type of vehicle described herein.

FIG. 2 illustrates a front perspective view of a vehicle equipped with the U-turn signal indicator 100 of the present invention in accordance with the disclosed specification. As shown, the indicator 100 is attached to the front bumper 202 of the vehicle 200, preferably positioned above the front license plate 204 on the front of the vehicle 200 such that operators of the oncoming vehicles, cyclists and pedestrians are alerted to the intention of a U-turn by the blinking/illuminating of the U-turn signal indicator 100. The indicator 100 can be removably or permanently mounted to the front of the vehicle. A conventional fastening mechanism such as mechanical fasteners, adhesive or any other fastening means may be used for mounting the indicator 100. The indicator 100 positioned on the front of the vehicle 200 is activated using an appropriate activation mechanism such as a lever arm (shown in FIG. 4) or an actuation button (shown in FIG. 5). The system may also include a speaker 201 such that if the vehicle is near a pedestrian crossing and the signal is not visible to pedestrians, then an audible sound is emitted, alerting them to the vehicle entering into the crosswalk area.

FIG. 3 illustrates a rear perspective view of the vehicle 200 equipped with the U-turn signal indicator 100 of the present invention in accordance with the disclosed speciation. As shown, the indicator 100 is attached to the rear bumper 302 of the vehicle 200, preferably positioned above the rear license plate 304 such that the blinking/illuminating U-turn signal indicator 100 alerts following vehicles, cyclists and pedestrians of the vehicle 200 to the intention of vehicle's operator to make U-turn. The indicator 100 on the rear bumper 302 can be removably or permanently mounted. A conventional fastening mechanism such as mechanical fasteners, adhesive or any other fastening means may be used for mounting the indicator 100. The indicator 100 positioned on the rear of the vehicle 200 is activated using an appropriate activation mechanism such as a lever arm (shown in FIG. 4) or an actuation button (shown in FIG. 5).

FIG. 4 illustrates a perspective view showing one potential embodiment of the U-turn signal activator arm inside a vehicle in accordance with the disclosed specification. The U-turn signal activator 402 is positioned adjacent to the steering wheel 404 of the vehicle 200 and can be deployed inside the vehicle 200 during manufacturing of the vehicle 200. The U-turn signal activation lever 402 is configured to be in an initial position 406 where the U-turn indicator 100 is deactivated. In use, the U-turn signal activation lever 402 is actuated to a lower position 408 to activate the U-turn signal indicating a U-turn in left direction. Thus, when the U-turn signal activation lever 402 is in lower position 408, then the LEDs illuminate in a running direction from arrow end 106 to the arrow end 104.

For indicating a U-turn signal in right direction, the activation lever 402 is actuated to an upper position 410 where the LEDs illuminate in a running direction from the arrow end 104 to the arrow end 106. The activation lever 402 simultaneously activates the U-turn indicators positioned on the front and rear of the vehicle (as shown in FIGS. 1&2) and also simultaneously or sequentially activates the U-turn indicator 100 positioned on the side mirror 412.

FIG. 5 illustrates a perspective view showing one potential embodiment of the U-turn indicator activator control buttons positioned inside the vehicle in accordance with the disclosed specification. The U-turn indicator activation buttons 502, 504 are positioned on the dashboard 506 of the vehicle 200, and can be retrofitted in the existing vehicle. The U-turn indicator activation button 502 is configured to simultaneously or sequentially activate the indicators positioned on the front, rear and side mirrors simultaneously to indicate U-turn in left direction of the vehicle. The U-turn indicator activation button 504 is configured to simultaneously or sequentially activate the indicators positioned on the front or rear of the vehicle 200 and side mirrors 410 simultaneously to indicate a U-turn in a right direction of the vehicle 200.

Figure 6:
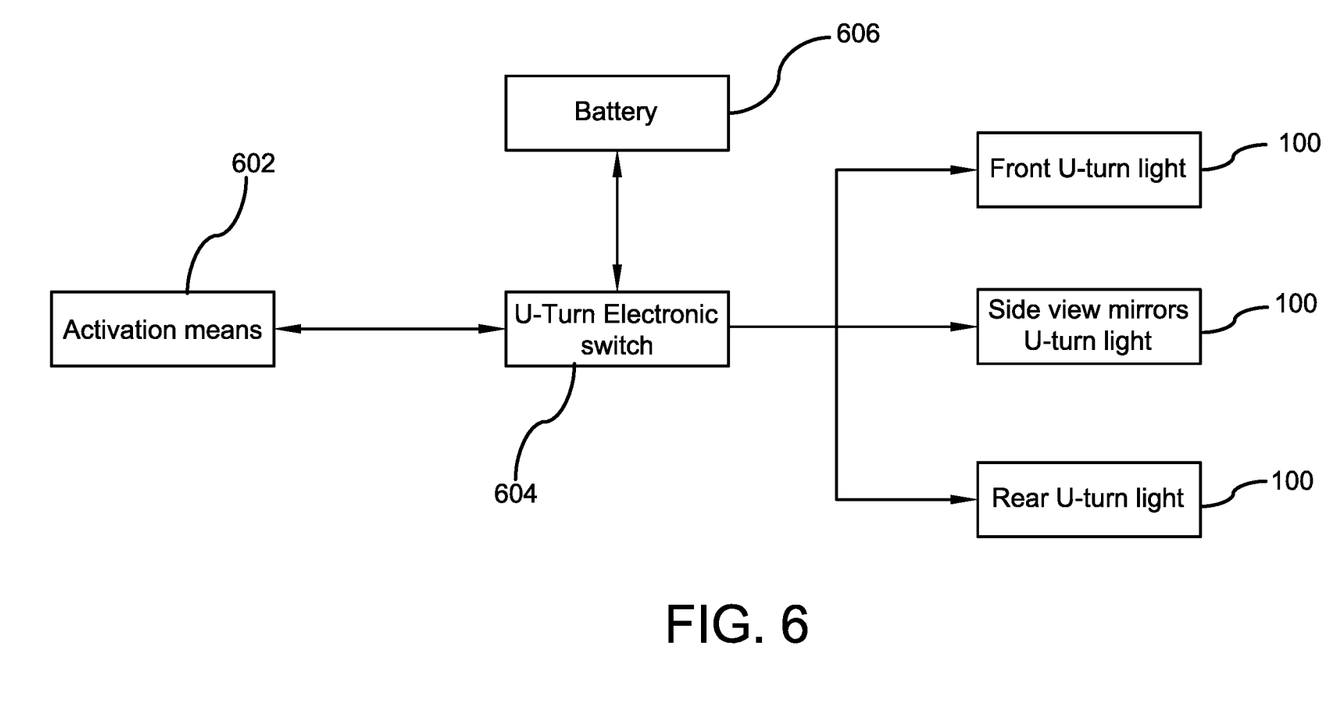
FIG. 6 illustrates a block diagram showing one potential embodiment of the U-turn indicator activation system for activating the indicator using the lever arm and activation buttons in accordance with the disclosed architecture.

FIG. 6 illustrates a block diagram showing one potential embodiment of the U-turn indicator activation system for activating the indicator using the lever arm 402 and activation button 502, 504 in accordance with the disclosed specification. As shown, the indication activation means 602 which includes one of the lever arm 402 and activation buttons 502, 504 is connected to a U-turn electronic switch 604 positioned in the Controller Area Network (CAN) of the vehicle. The switch 604 is coupled to the battery 606 of the vehicle for activating the front U-turn light, rear U-turn light and the side view mirrors U-turn lights.

When the U-turn indicator is retrofitted in an existing vehicle, then, the U-Turn electronic switch 604 is connected to the existing CAN of the vehicle and the activation buttons are mounted to the dashboard.

Figure 7:
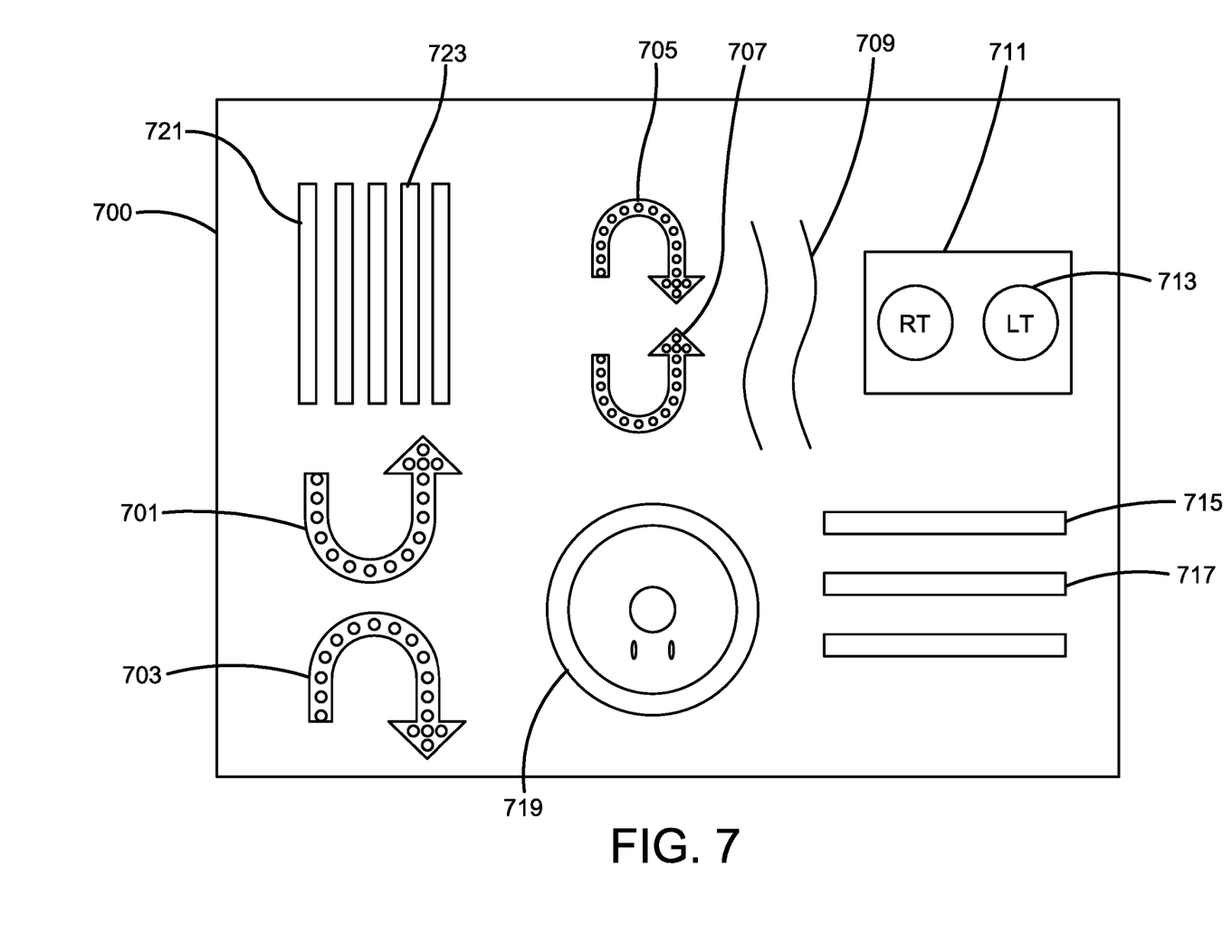
FIG. 7 illustrates one potential embodiment of an aftermarket kit to retrofit a vehicle with the U-turn indicator activation system of the present invention in accordance with the disclosed architecture.

FIG. 7 provides a kit that may be used to install the U-turn system of the present invention. The kit is provided in a package 700 which has a first set of two U-turn turning signals 701 and 703 for application to the frame or body of the vehicle and a second set of two U-turn signals that are a different size and preferably smaller 705 and 707 which may be applied to the side mirrors or other portions of the vehicles. The kit includes a set of wires 709 which can be used to connect the various signals to the control panel 711, which has left and right buttons 713 for activating the signals after installation. The control panel 711 is applied to a dashboard of the vehicle. Retroreflective tape 715, 717 may be provided in different colors to match the body trim as well as to increase the reflection of the signals in a low light condition. The retroreflective tape may be a beaded or prismatic tape available from 3M or Avery Dennison. The kit may also include a speaker 719 to be attached to the vehicle frame or body. The speaker can be applied underneath the hood or trunk, under body panels or elsewhere depending on the preferences of the operator. The speaker 719 is used to alert pedestrians or others that may not be able to see the U-turn signal. The signals, speaker and/or control panel may be installed using a double sided adhesive tape having layers of adhesive 723 and various liners 721.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "U-turn signal indicator", "U-turn indicator", "indicator", and "vehicle U-turn signal indicator" are interchangeable and refer to the vehicle U-turn signal indicator 100 of the present invention.

Notwithstanding the forgoing, the vehicle U-turn signal indicator 100 of the present invention can be of any suitable size and configuration as is known in the art without affecting the overall concept of the invention, provided that it accomplishes the above-stated objectives. One of ordinary skill in the art will appreciate that the vehicle U-turn signal indicator 100 as shown in the FIGS. is for illustrative purposes only, and that many other sizes and shapes of the vehicle U-turn signal indicator 100 are well within the scope of the present disclosure. Although the dimensions of the vehicle U-turn signal indicator 100 are important design parameters for user convenience, the vehicle U-turn signal indicator 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A combination vehicle and U-turn signal system comprising:
    a vehicle having a body comprised of a front body panel, a back body panel and a pair of side body panels;
    a first signal indicator provided on the front body panel;
    a second signal indicator provided on the back body panel, wherein each of the first and second signal indicators are comprised of a housing with an arrow shaped portion on each end of the housing;
    a pair of signal indicators, wherein at least one of the pair of signal indicators is provide on each of the pair of side body panels and comprises an arrow shaped portion on each end of a housing;
    an actuator for activating each of the first signal indicator, the second signal indicator and the pair of signal indicators; and
    a plurality of LED lights disposed within the housing and the arrow shaped portions, wherein the plurality of LED lights operate in one of a continuous, a sequential, a simultaneous or a combination lighting configuration, and further wherein the plurality of LED lights in the arrow shaped portions are a different color than the plurality of LED lights in the housing.

2. The combination as recited in claim 1 further comprising a controller for operating each of the first signal indicator, the second signal indicator and the pair of signal indicators.

3. The combination as recited in claim 1, wherein the plurality of LED lights comprise a prismatic lens.

4. The combination as recited in claim 1, wherein the plurality of LED lights are of different colors.

* * * * *